US012526360B2

(12) United States Patent
Llaca

(10) Patent No.: US 12,526,360 B2
(45) Date of Patent: Jan. 13, 2026

(54) GERM-BARRIER PHONE COVER

(71) Applicant: Jose Llaca, Ossining, NY (US)

(72) Inventor: Jose Llaca, Ossining, NY (US)

( * ) Notice: Subject to any disclaimer, the term of this patent is extended or adjusted under 35 U.S.C. 154(b) by 303 days.

(21) Appl. No.: 17/282,963

(22) PCT Filed: Oct. 9, 2019

(86) PCT No.: PCT/US2019/055341
§ 371 (c)(1),
(2) Date: Apr. 5, 2021

(87) PCT Pub. No.: WO2020/076913
PCT Pub. Date: Apr. 16, 2020

(65) Prior Publication Data
US 2021/0377379 A1    Dec. 2, 2021

Related U.S. Application Data

(60) Provisional application No. 62/766,187, filed on Oct. 9, 2018, provisional application No. 62/973,318, filed on Sep. 30, 2019.

(51) Int. Cl.
*H04M 1/17*    (2006.01)
*H04M 1/03*    (2006.01)

(52) U.S. Cl.
CPC ............... *H04M 1/17* (2013.01); *H04M 1/03* (2013.01)

(58) Field of Classification Search
CPC ....... H04M 1/17; H04M 1/03; H04R 2499/11; H04R 1/12
See application file for complete search history.

(56) References Cited

U.S. PATENT DOCUMENTS

| 3,012,108 A | 12/1961 | Bell |
| 3,962,555 A | 6/1976 | Efaw |
| 4,736,418 A | 4/1988 | Steadman |
| 5,012,513 A | 4/1991 | Dale et al. |
| 6,064,735 A | 5/2000 | Wilkes |
| 7,287,856 B2 | 10/2007 | Prisco |
| 2003/0012371 A1* | 1/2003 | Weinstock ............... H04R 1/12 379/452 |
| 2009/0060173 A1 | 3/2009 | Williams |

* cited by examiner

*Primary Examiner* — Tuan D Nguyen
(74) *Attorney, Agent, or Firm* — David Guerra

(57) ABSTRACT

A sanitary cover for a communication device may include at least two covers, each of the at least two covers creating a physical barrier between at least a portion of the communication device and a user. The sanitary cover for the communication device may include a connective strip configured to connect at least a first cover to a second cover of the at least two covers.

20 Claims, 2 Drawing Sheets

GERM-BARRIER PHONE COVER

CROSS-REFERENCE TO RELATED APPLICATION

This application claims the benefit of U.S. Provisional Application No. 62/766,187, filed on 9 Oct. 2018, and U.S. Provisional Application No. 62/TBD, filed on 23 Sep. 2019, the contents of both of which are incorporated herein by reference.

FIELD OF THE INVENTION

The present invention generally relates to a sanitary cover for communication devices and, more specifically, to a sanitary cover for telephone handsets communally utilized in public facilities and spaces for preventing the transfer of disease and/or infection-causing objects (e.g., microorganisms, germs, bacteria, viruses, etc.) between multiple persons sharing the telephone handsets.

BACKGROUND OF THE INVENTION

Regular handwashing is one of the simplest and most effective ways to remove germs, avoid getting sick, and prevent the spread of those germs to others. However, in many communal environments where multiple people, and thus many hands, touch shared surfaces and objects, exposure to germs is almost impossible to avoid. For many public facilities, which tend to offer no other choice but to use communal communication devices, transmission of contaminants and pathogens may occur at an increased rate. Accordingly, subsequent users of the communication device are likely to be exposed to these contaminates.

BRIEF SUMMARY OF DISCLOSURE

In one example implementation, a sanitary cover for a communication device may comprise at least two covers. Each of the at least two covers may create a physical barrier between at least a portion of the communication device and a user. The sanitary cover for the communication device may comprise a connective strip configured to connect at least a first cover to a second cover of the at least two covers.

One or more of the following example features may be included. The at least a portion of the communication device may comprise a telephone handset. The first cover may be configured to fit over a telephone handset mouthpiece, and the second cover may be configured to fit over a telephone handset earpiece. The connective strip may be configured to fit over a portion of the telephone handset extending between the telephone handset mouthpiece and the telephone handset earpiece. The at least two covers and the connective strip may comprise a unitary molded body. The unitary molded body may be configured to be molded to a specification to fit over the telephone handset. The unitary molded body may comprise a rubber compound. The rubber compound may be synthetic. The rubber compound may be non-porous. The rubber compound may comprise a hypoallergenic compound.

In another example implementation, a sanitary cover for a communication device may comprise at least two covers, each of the two covers creating a physical barrier between at least a portion of the communication device and a user, wherein the at least a portion of the communication device may comprise a telephone handset. The sanitary cover for the communication device may comprise a connective strip configured to connect at least a first cover to a second cover of the at least two covers, wherein the first cover may be configured to fit over a telephone handset mouthpiece, and the second cover may be configured to fit over a telephone handset earpiece, wherein the connective strip may be configured to fit over a portion of the telephone handset extending between the telephone handset mouthpiece and the telephone handset earpiece, and wherein the at least two covers and the connective strip may comprise a unitary molded body configured to be molded to a specification to fit over the telephone handset.

According to another implementation, a method for sanitary use of a communication device may include providing a sanitary cover for the communication device. The sanitary cover may include at least two covers. Each of the at least two covers may be configured to create a physical barrier between at least a portion of the communication device and a user. The sanitary cover may further include a connective strip configured to connect at least a first cover to a second cover of the at least two covers. The method may further include installing the sanitary cover on the communication device. Installing the sanitary cover may include fitting the first cover over a first component of the communication device, and fitting the second cover over a second component of the communication device. The method may also include conducting a communication session using the communication device having the sanitary cover installed.

One or more of the following features may be included. The first component of the communication device may include a mouthpiece, and the second component of the communication device may include an earpiece. The first cover may include a cup structure, and fitting the first cover over the first component of the communication device may include sliding the first cover over the first component of the communication device. The second cover may include a cup structure, and fitting the second cover over the second component of the communication device may include sliding the second cover over the second component of the communication device. The first cover may include an at least partially elastic cup structure, and fitting the first cover over the first component of the communication device may include stretching the first cover over the first component of the communication device. The second cover may include an at least partially elastic cup structure, and fitting the second cover over the second component of the communication device may include stretching the second cover over the second component of the communication device.

The method may include sanitizing the sanitary cover at least one of before use of the communication device and after use of the communication device. Sanitizing the sanitary cover may include washing the sanitary cover. Sanitizing the sanitary cover may include applying a sanitizing agent to at least a portion of the sanitary cover.

The method may also include removing the sanitary cover from the communication device upon completion of the communication session. The sanitary cover may include a reusable structure.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example fea-

BRIEF DESCRIPTION OF THE DRAWINGS

Like reference symbols in the various drawings indicate like elements.

DETAILED DESCRIPTION

Figure 1:
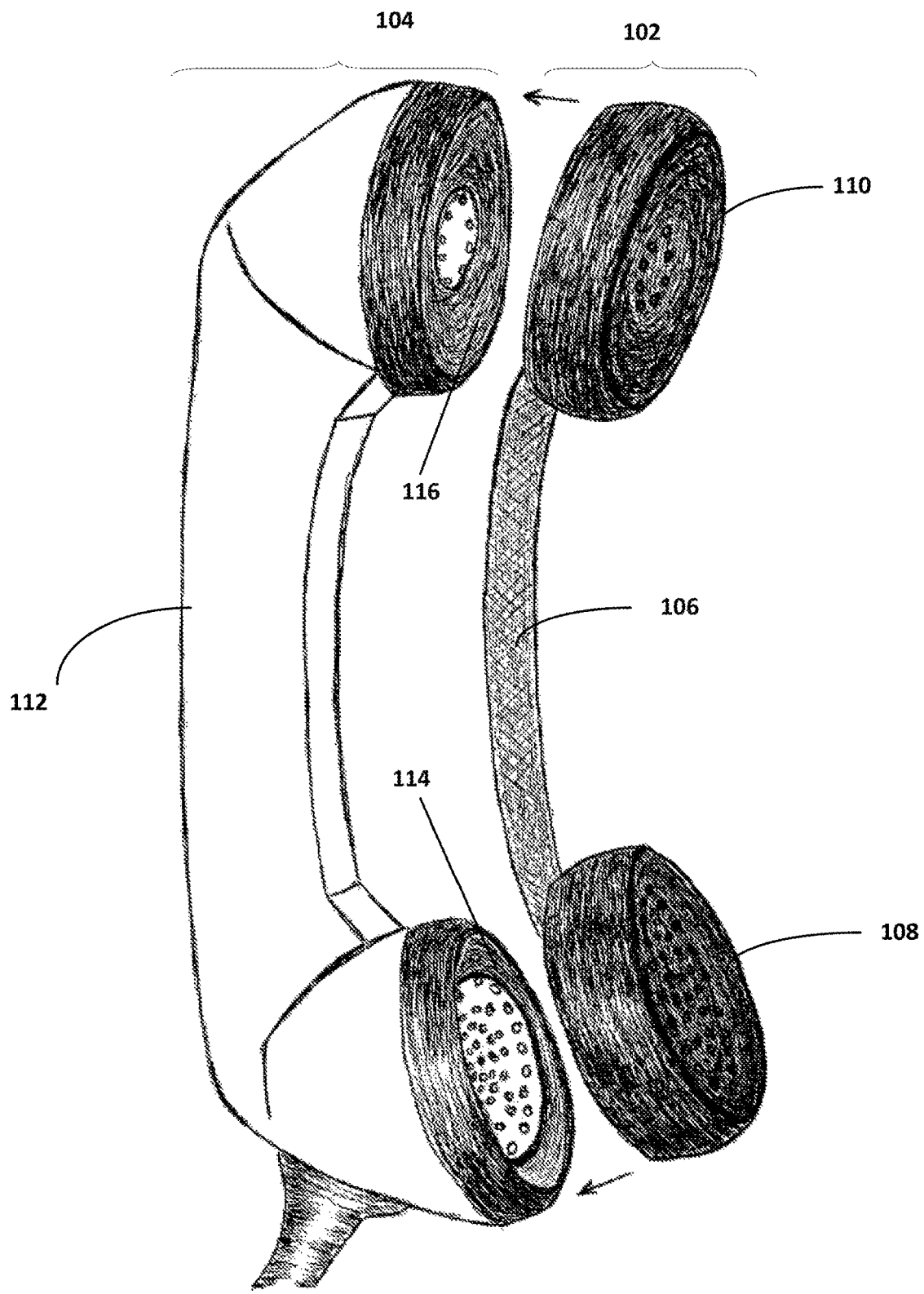
FIG. 1 is side perspective view of an example sanitary cover apparatus as applied to a telephone handset of a communication device according to one or more example implementations of the disclosure.

In many communal environments where multiple people, and thus many hands, touch shared surfaces and objects, exposure to germs is almost impossible to avoid. In fact, for many public facilities (e.g., hospitals, prisons, hotels, office buildings, phone booths, etc.), which often offer no other choice but to use communal communication devices, transmission of contaminants and pathogens may occur at an increased rate. As such, some people resort to using socks, handkerchiefs, and paper towels to create a barrier that will protect them from getting sick.

Recognizing that many prisons and jails expose prisoners to dangerous environmental conditions like a lack of basic sanitation, and harbor germs and viruses which cause various illnesses, ailments, and even death, additional protective measures to help prevent the transfer of disease and/or infection-causing objects (e.g., microorganisms, germs, bacteria, viruses, etc.) between multiple persons using communal communication devices are especially desired. In fact, based on some informal estimates, approximately 90% of the prison population (i.e., roughly 2,000,000 people) in the United States use communal communication devices to communicate with loved ones and attorneys. As such, it would be nearly impossible to properly clean every phone after every use. However, by placing a sanitary cover on the communal communication devices prior to using a telephone handset, users may dramatically reduce their contact with these ailments. The use of sanitary covers for communal communication devices may provide similar benefits in various additional and/or alternative situations in which individuals may utilize shared communication devices.

Communal communication devices (e.g., telephone receivers, handsets, etc.) are typically held by a user's hand and placed next to the user's mouth, nose, and ear allowing for easy transmission of such contaminants. In some cases, facial hair may exacerbate the deposition of contaminates onto a communication device. The user may also deposit contaminates onto the communication device when he or she exhales, speaks, sneezes, burps, coughs, or otherwise releases air and saliva from his or her mouth or nose during use of the communication device. Accordingly, providing an actual physical and anti-microbial barrier between a user and a telephone handset may lower the probability and lessen the likelihood of contracting and spreading germs and viruses, such as, for example, The Rhino Virus (FLU), Avian FLU, everyday colds, stomach viruses, and any other ailment that may be spread or transferred from person to person via touch or bodily fluids (e.g., saliva, mucus, etc.). In addition to reducing one's risk of contact with the foregoing health concerns, the act of placing an actual physical and anti-microbial barrier on a communication device may help to alleviate some of the anxiety associated with having to use a less-than sanitary public or communal communication devices, especially in areas containing large populations of people in close proximity where rampant spread of illness is extremely prevalent.

Various examples of communication devices are commercially available as standalone devices (e.g., pay phones, call boxes, telephone booths), and/or as wireless electronic devices (e.g., cellphones, smartphones, or the like). It will be appreciated that while several examples and figures reference use of a sanitary cover for retro (i.e., classic, vintage, or old-school) handheld phones, these are for example purposes only and any style of handheld phones can be imagined within the scope of the present disclosure.

Figure 2:
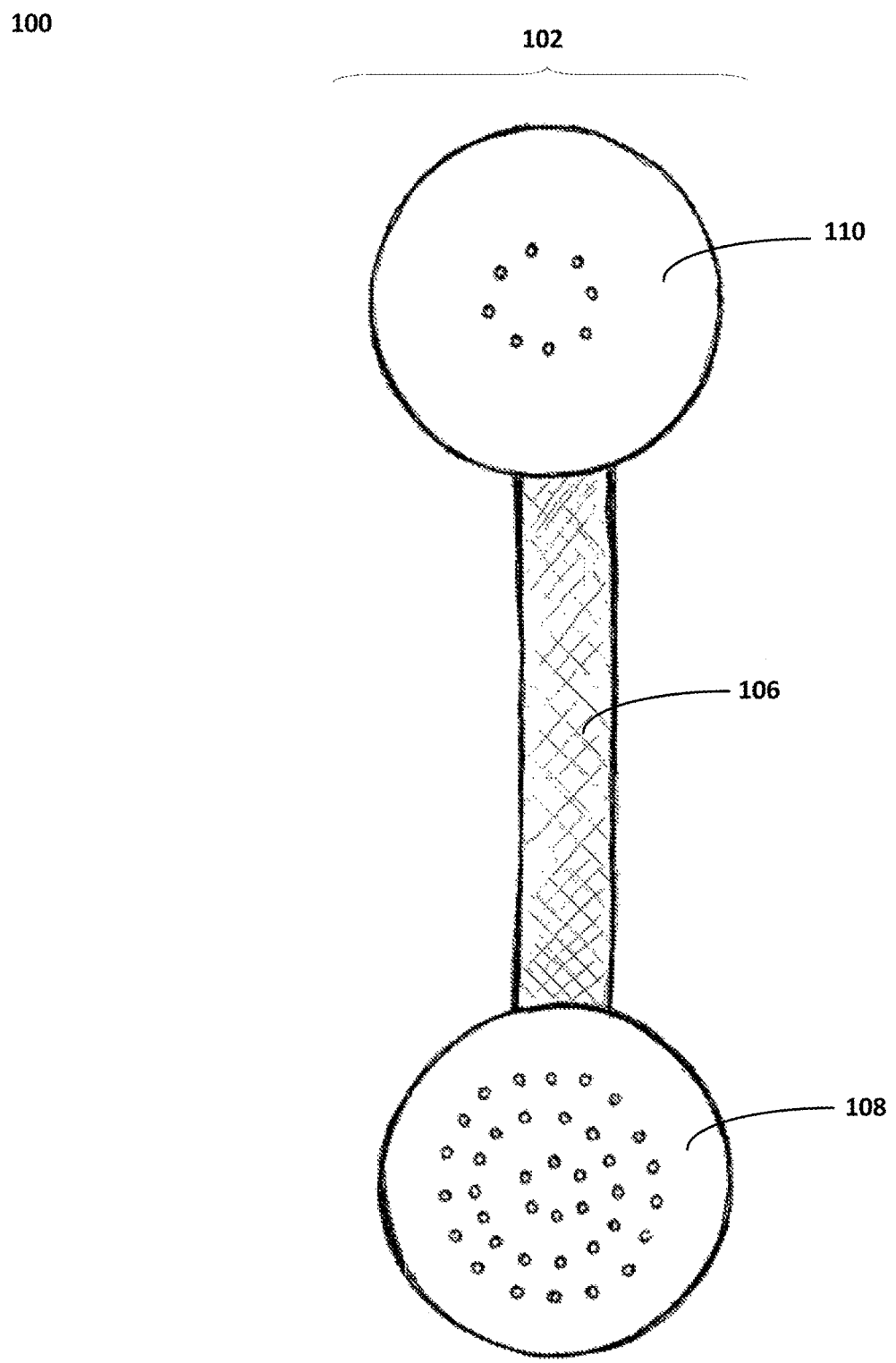
FIG. 2 is a front perspective view of an example sanitary cover apparatus of FIG. 1 according to one or more example implementations of the disclosure.

As generally discussed above, and referring at least to the example implementations of FIGS. 1-2, an example apparatus 100 may comprise sanitary cover 102 for communication device 104 comprising at least two covers, each of the at least two covers creating a physical barrier between at least a portion of communication device 104 and a user. Sanitary cover 102 may comprise connective strip 106 configured to connect at least first cover 108 to second cover 110 of the at least two covers.

In some implementations, apparatus 100 may comprise sanitary cover 102 for communication device 104 comprising at least two covers, each of the at least two covers creating a physical barrier between at least a portion of communication device 104 and a user. For example, and referring at least to the example implementations of FIGS. 1-2, an example sanitary cover 102 is shown. As will be described in greater detail below, sanitary cover 102 may include at least two covers and/or cup structures consisting of a synthetic rubber made to a specification that may fit over a mouthpiece and an earpiece of a telephone receiver. By affixing the at least two covers to at least the mouthpiece and the earpiece of the telephone receiver, the at least two covers may create a physical barrier between at least a portion of communication device 104 and a user. For example, when the at least two covers are applied to at least the portion of communication device 104, the level of physical contact between the user and communication device 104 may be greatly reduced and, more specifically, at the respective mouthpiece and earpiece where an anti-microbial barrier may be most important.

In some implementations, sanitary cover 102 for communication device 104 may comprise connective strip 106 configured to connect at least first cover 108 to second cover 110 of the at least two covers. As noted above, and referring again to the example implementations of FIGS. 1-2, in some implementations, connective strip 106 may connect the at least two covers at the midsection of communication device 104 by a strip of material. For example, the connection of the at least two covers and connective strip 106 may create a single, unitary, molded body (i.e., one-piece molded phone cover), that may be custom-made to fit the specification and dimension of the respective communication device. As will be further discussed, connective strip 106 and the at least two covers may comprise the same material. It will be appreciated that the midsection of communication device 104 may be defined as the neck and/or handle of the communication device and positioned between the respective mouthpiece and earpiece.

In some implementations, the at least a portion of communication device 104 may comprise telephone handset 112. For example, and as will be discussed in greater detail below, telephone handset 112 may be a component of at least a portion of communication device 104 that a user holds to their ear and mouth to receive audio through a receiver (i.e., earpiece) and speak to a remote party via a built-in transmitter (i.e., mouthpiece). For example, telephone handset 112 may include, but is not limited to, a handheld telephone receiver used for everyday work in private domiciles as well as in public facilities such as, for example, hospitals, hotels, office buildings, prisons and jails across the U.S. and abroad.

In some implementations, first cover 108 may be configured to fit over telephone handset mouthpiece 114, and second cover 110 may be configured to fit over telephone handset earpiece 116. For example, the at least two covers, including first cover 108 and second cover 110, may be constructed from a single solution or compound mixture of mold making materials to create a custom-made design configured to fit the specification and dimension of a respective communication device. In some implementations, the resulting mold of first cover 108 may correspond to the specific fit and dimension of telephone handset mouthpiece 114, and the resulting mold of second cover 110 may correspond to the specific fit and dimension of telephone handset earpiece 116. For example, suppose a user wishes to use a communal communication device. Consistent with such example, the user may, prior to using the communal communication device, place first cover 108 over the respective telephone handset mouthpiece 114, and second cover 110 over the respective telephone handset earpiece 116.

In order to facilitate the transmission of sound from the user to the mouthpiece 114 of the communication device 104 (and the operative components therein), the first cover 108 may include one or more openings and/or holes extending through the first cover 108. For example, the openings and/or holes may extend from a front face of the first cover 108, which may be generally adjacent to the user's mouth during use, to the rear face of the first cover 108, which may be generally adjacent to the mouthpiece 114 of the communication device 104 to allow better transmission of the user's voice (and/or other sounds) through the first cover 108, which may improve the quality of the communication. The one or more openings may include, but are not limited to, holes, slots, cutouts, and the like. Consistent with some embodiments, the one or more openings may be arranged in a generic pattern, e.g., which may generally facilitate sound transmission through the first cover for a variety of communication devices. In some embodiments, the one or more openings may be configured for use with particular communication devices. For example, the one or more openings may be sized and arranged to generally align with at least a portion of corresponding openings in the mouthpiece of the communication device (which, as is known, facilitate the transmission of sound to a microphone, or other transducer, housed in the mouthpiece). In some such embodiments, the plurality of openings in the first cover may directly correspond to openings in the mouthpiece. For example, if the mouthpiece includes a plurality of holes, the first cover may include a corresponding plurality of holes arranged in the same, and/or in a similar, patter as the holes in the mouthpiece. Consistent with such an embodiment, the number and arrangement of openings in the mouthpiece may be identified/captured during the molding process for reproduction in the first cover. In some embodiments, the first cover may include a different arrangement of openings than the mouthpiece. For example, the first cover may include a fewer number of openings than the mouthpiece, in which the fewer number of openings are of a larger size than the openings in the mouthpiece. In such an embodiment, a single opening in the first cover may generally overlap with/expose more than one of the openings in the mouthpiece. Similarly, in some embodiments, the first cover may include one or more slots. The one or more slots may generally overlap with/expose one, or more than one, of the openings in the mouthpiece. For example, the first cover may include a series of slots that may each overlap with/expose a line of openings (such as holes, slots, and/or cutouts) in the mouthpiece. In such embodiments, the slots may include linear slots, curves slots, and/or slots having any other desired shape and/or configuration.

In a corresponding manner, in order to facilitate the transmission of sound from the earpiece 116 of the communication device 104 (and the operative components therein) to the user, the second cover 110 may include one or more openings and/or holes extending through the second cover 110. For example, the openings and/or holes may extend from a front face of the second cover 110, which may be generally adjacent to the user's ear during use, to the rear face of the second cover 110, which may be generally adjacent to the earpiece 116 of the communication device 104 to allow better transmission of sounds through the second cover 110, which may improve the quality of the communication. The one or more openings may include, but are not limited to, holes, slots, cutouts, and the like. Consistent with some embodiments, the one or more openings may be arranged in a generic pattern, e.g., which may generally facilitate sound transmission through the second cover for a variety of communication devices. In some embodiments, the one or more openings may be configured for use with particular communication devices. For example, the one or more openings may be sized and arranged to generally align with at least a portion of corresponding openings in the earpiece of the communication device (which, as is known, facilitate the transmission of sound from a speaker, or other transducer, housed in the earpiece). In some such embodiments, the plurality of openings in the second cover may directly correspond to openings in the earpiece. For example, if the earpiece includes a plurality of holes, the second cover may include a corresponding plurality of holes arranged in the same, and/or in a similar, pattern as the holes in the earpiece. Consistent with such an embodiment, the number and arrangement of openings in the earpiece may be identified/captured during the molding process for reproduction in the second cover. In some embodiments, the second cover may include a different arrangement of openings than the earpiece. For example, the second cover may include a fewer number of openings than the earpiece, in which the fewer number of openings are of a larger size than the openings in the earpiece. In such an embodiment, a single opening in the second cover may generally overlap with/expose more than one of the openings in the earpiece. Similarly, in some embodiments, the second cover may include one or more slots. The one or more slots may generally overlap with/expose one, or more than one, of the openings in the earpiece. For example, the second cover may include a series of slots that may each overlap with/expose a line of openings (such as holes, slots, and/or cutouts) in the earpiece. In such embodiments, the slots may include linear slots, curves slots, and/or slots having any other desired shape and/or configuration.

In some implementations, the connective strip 106 may join the first cover 108 and the second cover 110, e.g., to allow a user to better keep track of the first cover 108 and the second cover 110 (e.g., to reduce the chances that one or both of the first cover and the second may be misplaced or lost). In some implementations, connective strip 106 may be configured to fit over a portion of telephone handset 112 extending between telephone handset mouthpiece 114 and telephone handset earpiece 116. For example, connective strip 106 may be constructed from a single solution or compound mixture of mold making materials to create a custom-made design configured to fit the specification and dimension of a respective communication device. In some implementations, the resulting mold of connective strip 106 may correspond to the specific fit and dimension of the midsection of communication device 104 and, more specifically, over a portion of telephone handset 112 extending between telephone handset mouthpiece 114 and telephone handset earpiece 116. Consistent with the previous example, after a user places first cover 108 over the respective telephone handset mouthpiece 114, and second cover 110 over the respective telephone handset earpiece 116, connective strip 106 may default to a position corresponding to the specific fit and dimension of the midsection of communication device 104. In some embodiments, the connective strip may reduce contact between the user and the midsection of the communication device 104, e.g., which may improve the sanitary use of the communication device.

In some implementations, the at least two covers and connective strip 106 may comprise a unitary molded body. As noted above, in some implementations, connective strip 106 may connect the at least two covers at the midsection of communication device 104 by a strip of similar material. For example, the connection of the at least two covers and connective strip 106 may create a single, unitary, molded body that may be custom-made to fit the specification and dimension extending between telephone handset mouthpiece 114 and telephone handset earpiece 116 of the respective communication device. In other embodiments, the connective strip may not be custom-made to fit a particular communication device, but may rather simply serve the purpose of reducing the likelihood of the first and second covers becoming separated from one another and/or misplaced. As will be further described below, in some implementations, the unitary molded body may be prepared via an injection style mold of hypoallergenic, synthetic, rubber compound.

In some implementations, the unitary molded body may be configured to be molded to a specification to fit over telephone handset 112. Consistent with the previous example, the connection of the at least two covers and connective strip 106 may create a unitary molded body that is custom-made to fit the specifications and dimensions of a respective communication device. In some implementations, the unitary molded body may be made by pouring a mold making material into a custom-made mold or casing designed with the desired specifications and dimensions that correspond to the specific telephone handset of the respective communication device. It will be appreciated that the method of pouring the mold making material into a custom-made mold corresponding to the respective communication device may be applied to any style of handheld phones that can be imagined within the scope of the present disclosure. Additionally, other approaches may be implemented for producing the sanitary cover, such as, but not limited to, injection molding, thermoforming, roto-molding, open or closed mold casting, stamping, thermal stamping, etc.

In some implementations, the unitary molded body may comprise a rubber compound (herein, intended to indicate a rubber-like material having elastic qualities, and limited to natural or synthetic rubbers). In some such embodiments, the elastic character of the rubber compound may allow the sanitary cover to be used with a variety of communication devices (e.g., as the first and second covers may be stretched over the mouthpiece and earpiece of the communication device). As noted above, in some implementations, the unitary molded body may be made by pouring a molding material into a custom-made mold designed with the desired specifications and dimensions of the respective communication device (however, various additional and/or alternative production processes may be utilized, as generally described above). The molding material may include, but is not limited to the rubber compound. In some implementations, the molding material may be made from a natural and/or man-made rubber such as, for example, natural latex, polyurethane, and silicone for their known flexible properties and ability to reproduce extraordinary detail from their respective casings. It will be appreciated that a wide variety of flexible and/or elastic materials may be utilized for producing a sanitary cover consistent with the present disclosure, depending upon manufacturing process, design characteristics, user need/desire, and the like. As such, it will be appreciated that any suitable elastomeric, rubber, and/or generally flexible material may be utilized to produce the sanitary cover. Further, in some embodiments, e.g., in which a sanitary cover may be specifically produced to correspond to a particular communication device, the sanitary cover may include a rigid and/or semi-rigid structure that may, e.g., snap over at least a portion of the communication device, and/or otherwise generally conform to the communication device. In some implementations, the rubber compound may comprise anti-microbial properties and as such, may create an anti-microbial barrier between at least the portion of communication device 104 and the user. For example, and as is known, antimicrobial substances may be used as an agent to kill microorganisms and inhibit their growth. As such, it will be appreciated that the antimicrobial properties of the rubber compound may serve as a dual defense in providing a physical barrier between at least the portion of communication device 104 and the user, and kill a wide range of microbes on non-living surfaces and/or inhibit growth of the same to prevent the spread of illness.

In some implementations, the rubber compound may be synthetic. For example, and as is known, synthetic rubber may include, but is not limited to, any artificial elastomer made from various petroleum-based monomers, and may be controlled by design to give optimal properties from the addition of impurities and/or additives. It will be appreciated that given the durable nature of synthetic rubber, such material provides a user the ability to easily clean and reuse sanitary cover 102 multiple times. As noted above, various additional and/or alternative materials may also be utilized.

In some implementations, the rubber compound may be non-porous. For example, and as is known, the construction of a non-porous material may be configured to impede fluid absorption due to it being tightly bound and restrictive to air-flow. It will be appreciated that use of non-porous materials as part of the rubber compound may readily prevent the spread of germs due to the natural impediment to the flow of contaminating particles and bodily fluid from communication device 104 to the user. Additionally and/or alternatively, the use of a non-porous material may facilitate cleaning and/or sanitizing of the sanitary cover.

Consistent with various embodiments of the present disclosure, the sanitary cover 102 may be releasably/removably retained to at least a portion of the communication device (e.g., releasably retained to one or more of the mouthpiece 114 and/or the earpiece 116) in a manner that allows for relatively simple installation and/or removal of the sanitary cover 102 from the communication device. For example, in some embodiments the first cover 108 and/or the second cover 110 may be sized and shaped to effectuate a friction fit relative to the mouthpiece 114 and/or the earpiece 116 (respectively). In some such embodiments, the friction fit may be based upon, at least in part, the geometries of the first cover 108 relative to the mouthpiece 114 and/or the second cover 110 relative to the earpiece 116 and a closeness of dimensions (e.g., closeness of fit). In some embodiments, as generally discussed above, the sanitary cover may be made of a rubber or elastic/elastomeric material. In some such embodiments, the rubber or elastic/elastomeric material may exhibit a relatively high coefficient of friction may aid in releasably retaining the sanitary cover to the communication device. In some embodiments, in which the sanitary cover is made from a rubber and/or elastic material, the elastic character of the material may be utilized, at least in part, for releasably retaining the sanitary cover to the communication device. For example, the sanitary cover may be sized such that the first cover may be at least slightly stretched to fit over the mouthpiece and/or the second cover may be at least slightly stretched to fit over the earpiece. Consistent with such an embodiment, at least slightly stretching one or both of the covers to fit over portions of the communication device may aid in releasably retaining the sanitary cover to the communication device. Further, in some embodiments, in which the sanitary cover is made from a rubber and/or elastic material, the elastic character imparted to the sanitary cover may allow the sanitary cover to conform to communication devices having different shapes and/or sized. For example, the sanitary cover may be stretched over and/or elastically conform to, communication device having different shapes and/or sizes. Consistent with the foregoing, in some embodiments the sanitary cover may be removably retained to at least a portion of the communication device without the need for mechanical fastening (e.g., snap fit features, hinges, components that go around a handset to hold the cover in place, etc.). As such, in some embodiments the sanitary cover may provide for simple installation and removal (e.g., by simply fitting the first and second covers over the respective mouthpiece and earpiece of the communication device). However, in some embodiments such mechanical fastening features may be utilized (alone and/or in conjunction with the foregoing attributes) for releasably retaining the cover to the handset.

In some implementations, the rubber compound may comprise a hypoallergenic compound. For example, and as is known, a hypoallergenic compound may include, but is not limited to, ingredients that have a low potential for causing adverse reactions for the majority of people. As such, it will be appreciated that use of hypoallergenic rubber compounds may not contain the rubber-associated proteins that are responsible for sensitization in allergic individuals, and therefore may ensure the highest quality product for a larger customer base.

Consistent with the forgoing, a user may realize at least some degree of sanitary protection from any biological and/or non-biological contaminants that may be present on a communication device, such as a shared telephone, or the like. For example, a sanitary cover consistent with the present disclosure may be placed over at least a portion of a shared phone (or other shared communication device) and may reduce the degree of contact that a user may make with the phone. In particular, in some embodiments, a sanitary cover may be positioned over at least a mouthpiece and an earpiece of a shared phone (e.g., which may be the portions of the phone that may be the most likely to contaminated and/or may be the portions of the phone that are most closely positioned relative to likely infection transmission portions of the anatomy, such as the mouth, nose, and ears). Accordingly, in some embodiments, a sanitary cover consistent with the present disclosure may reduce the occurrence and/or likelihood of transmission of contaminants from a shared communication to a user and/or from a user to a shared communication device. Further, in some embodiments, a sanitary cover consistent with the present disclosure may be generally easily cleansed (e.g., before and/or after use), such as through washing and/or through the application of a sanitizing agent (e.g., alcohol, hand sanitizer, soap, bleach, etc.).

Consistent with the foregoing, an individual to use the sanitary cover to allow the use of a communication device (e.g., such as a communal telephone, or a telephone owned by another), while reducing the likelihood of contacting biological and/or other foreign contaminants that may be present on the communication device. For example, the individual, or user, may provide a sanitary cover for the communication device. The sanitary cover may generally include at least two covers. Each of the at least two covers may be configured to create a physical barrier between at least a portion of the communication device and a user. The sanitary cover may further include a connective strip configured to connect at least a first cover to a second cover of the at least two covers. The sanitary cover may be installed on the communication device. For example, installing the sanitary cover may generally include fitting the first cover over a first component of the communication device, and fitting the second cover over a second component of the communication device. Once the sanitary cover has been installed on the communication device, the user may conduct a communication session (e.g., such as a telephone call) using the communication device having the sanitary cover installed. In the foregoing manner, the sanitary cover may reduce the likelihood that the user may contact any contaminants (e.g., biological—such as germs, bodily fluids, etc.—and/or other contaminants) that may be on the communication device.

As will generally be appreciated, the mouthpiece and earpiece of a communion device may be areas that may be particularly susceptible to contamination, and may represent portions of the communication device that are likely to contact, and/or come in close proximity to, a user's mouth, nose, and ears, which may be particularly susceptible to receiving contamination (such as pathogens, etc.). Accordingly, consistent with some embodiments, the first component of the communication device may include a mouthpiece, and the second component of the communication device may include an earpiece. Further, in some embodiments, the first cover may include a cup structure. As such, the fitting the first cover over the first component of the communication device may include sliding the first cover over the first component of the communication device. In this regard, the first cover may at least partially cover and/or overly the first component (e.g., which may include a mouthpiece) of the communication device. Similarly, the second cover may include a cup structure. Fitting the second cover over the second component of the communication device may include sliding the second cover over the second component of the communication device. In a similar manner as described with respect to the first cover, in this regard, the second cover may at least partially cover and/or overlay the second component (e.g., which may include an earpiece) of the communication device.

According to some example embodiments, the first cover may include an at least partially elastic cup structure. In such an embodiment, fitting the first cover over the first component of the communication device may include stretching the first cover over the first component of the communication device. Similarly, in some embodiments the second cover may include an at least partially elastic cup structure. Fitting the second cover over the second component of the communication device may include stretching the second cover over the second component of the communication device. Consistent with such an example embodiment, the sanitary cover may be relatively securely, yet removably, coupled to the communication device.

As generally described above, the sanitary cover may reduce the likelihood of a user contacting contaminants on a communication device, e.g., by at least partially covering portions of the communication device. However, it will be appreciated that, as the sanitary cover may contact contaminated portions of the communication device. Accordingly, consistent with some example embodiments, the sanitary cover may be sanitized at least one of before use of the communication device and after use of the communication device. For example, the sanitary cover may be sanitized between uses, which may reduce the likelihood of the user contacting any contaminant that may have been transferred to the sanitary cover from, e.g., a communication device during a prior use. In some embodiments, sanitizing the sanitary cover may include washing the sanitary cover. For example, standard soap or other cleaning agents that may cleanse the sanitary cover of various varieties of contamination may be used to wash the sanitary cover. In some embodiments, sanitizing the sanitary cover may include applying a sanitizing agent to at least a portion of the sanitary cover. Examples of sanitizing agents may include, for example, alcohol, hand sanitizer, and/or other suitable sanitizing agents that may, for example, kill a variety of pathogens.

Continuing with the foregoing, in some embodiments the sanitary cover may be produced from a relatively durable material, e.g., which may be capable of holding up to several, and even many, uses. As such, upon completion of the communication session the sanitary cover may be removed from the communication device. In this manner, the sanitary cover may be used on future occasions (e.g., optionally being sanitized between uses). Accordingly, the sanitary cover consistent with some embodiments may include a reusable structure, e.g., that can be used over and over again.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

A number of implementations have been described. Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A sanitary cover for a communication device comprising:
   at least two covers, each of the at least two covers creating a physical barrier between at least a portion of the communication device and a user;
   a connective strip configured to connect at least a first cover to a second cover of the at least two covers;
   wherein the at least a portion of the communication device comprises a telephone handset, and the connective strip being configured to fit over only one side of the telephone handset.

2. The sanitary cover for the communication device according to claim 1, wherein the at least two covers each includes an at least partially elastic cup structure configured to fit over a first component of the communication device and a second component of the communication device, respectively.

3. The sanitary cover for the communication device according to claim 2, wherein the at least two covers is a first cover configured to fit over a telephone handset mouthpiece, and a second cover is configured to fit over a telephone handset earpiece.

4. The sanitary cover for the communication device according to claim 3, wherein the one side of the telephone handset extends between the telephone handset mouthpiece and the telephone handset earpiece.

5. The sanitary cover for the communication device according to claim 1,
   wherein the at least two covers and the connective strip comprise a unitary molded body.

6. The sanitary cover for the communication device according to claim 5 wherein the unitary molded body is configured to be molded to a specification to fit over the telephone handset.

7. The sanitary cover for the communication device according to claim 5 wherein the unitary molded body comprises a rubber compound.

8. The sanitary cover for the communication device according to claim 7 wherein the rubber compound is synthetic.

9. The sanitary cover for the communication device according to claim 7 wherein the rubber compound is non-porous.

10. The sanitary cover for the communication device according to claim 7 wherein the rubber compound comprises a hypo-allergenic compound.

11. A sanitary cover for a communication device comprising:
- at least two covers, each of the two covers creating a physical barrier between at least a portion of the communication device and a user, wherein the at least a portion of the communication device comprises a telephone handset;
- a connective strip configured to connect at least a first cover to a second cover of the at least two covers,
- wherein the first cover is configured to fit over a telephone handset mouthpiece, and the second cover is configured to fit over a telephone handset earpiece,
- wherein the connective strip is configured to fit over only one side of the telephone handset extending between the telephone handset mouthpiece and the telephone handset earpiece, and
- wherein the at least two covers and the connective strip comprise a unitary molded body configured to be molded to a specification to fit over the telephone handset.

12. A method for sanitary use of a communication device comprising:
- providing a sanitary cover for the communication device comprising:
  - at least two covers, each of the at least two covers configured to create a physical barrier between at least a portion of the communication device and a user;
  - a connective strip configured to connect at least a first cover to a second cover of the at least two covers;
  - wherein the at least a portion of the communication device comprises a telephone handset;
- installing the sanitary cover on the communication device comprising:
  - fitting the first cover over a first component of the communication device, and
  - fitting the second cover over a second component of the communication device;
  - fitting the connective strip over only one side of the telephone handset; and
- conducting a communication session using the communication device having the sanitary cover installed.

13. The method according to claim 12, wherein the first component of the communication device includes a mouthpiece, and the second component of the communication device includes an earpiece.

14. The method according to claim 12, wherein:
- the first cover includes a cup structure, and fitting the first cover over the first component of the communication device includes sliding the first cover over the first component of the communication device; and
- the second cover includes a cup structure, and fitting the second cover over the second component of the communication device includes sliding the second cover over the second component of the communication device.

15. The method according to claim 12, wherein:
- the first cover includes an at least partially elastic cup structure, and fitting the first cover over the first component of the communication device includes stretching the first cover over the first component of the communication device; and
- the second cover includes an at least partially elastic cup structure, and fitting the second cover over the second component of the communication device includes stretching the second cover over the second component of the communication device.

16. The method according to claim 12, further comprising sanitizing the sanitary cover at least one of before use of the communication device and after use of the communication device.

17. The method according to claim 16, wherein sanitizing the sanitary cover includes washing the sanitary cover.

18. The method according to claim 16, wherein sanitizing the sanitary cover includes applying a sanitizing agent to at least a portion of the sanitary cover.

19. The method according to claim 12, further comprising removing the sanitary cover from the communication device upon completion of the communication session.

20. The method according to claim 19, wherein the sanitary cover includes a reusable structure.

* * * * *